United States Patent
Horovitz et al.

(10) Patent No.: US 10,049,048 B1
(45) Date of Patent: Aug. 14, 2018

(54) METHOD AND SYSTEM FOR USING PROCESSOR ENCLAVES AND CACHE PARTITIONING TO ASSIST A SOFTWARE CRYPTOPROCESSOR

(71) Applicant: Facebook, Inc., Menlo Park, CA (US)

(72) Inventors: Oded Horovitz, Palo Alto, CA (US); Stephen A. Weis, San Francisco, CA (US); Sahil Rihan, Menlo Park, CA (US); Carl A. Waldspurger, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 377 days.

(21) Appl. No.: 14/504,203

(22) Filed: Oct. 1, 2014

Related U.S. Application Data

(60) Provisional application No. 61/885,477, filed on Oct. 1, 2013.

(51) Int. Cl.
| | | |
|---|---|---|
| G06F 12/08 | (2016.01) | |
| G06F 12/0871 | (2016.01) | |
| G06F 12/0846 | (2016.01) | |
| G06F 12/14 | (2006.01) | |
| G06F 21/74 | (2013.01) | |
| G06F 21/60 | (2013.01) | |

(52) U.S. Cl.
CPC ...... *G06F 12/0871* (2013.01); *G06F 12/0848* (2013.01); *G06F 12/145* (2013.01); *G06F 21/74* (2013.01); *G06F 21/602* (2013.01); *G06F 2212/1052* (2013.01); *G06F 2212/282* (2013.01); *G06F 2212/402* (2013.01)

(58) Field of Classification Search
CPC .... G06F 12/0675; G06F 12/14; G06F 12/145; G06F 21/556; G06F 21/606; G06F 21/6227; G06F 12/1408; G06F 12/0871; G06F 12/0848; G06F 21/602; G06F 2212/1052; G06F 2212/402; G06F 2212/282; G06F 21/74
See application file for complete search history.

(56) References Cited

U.S. PATENT DOCUMENTS

| | | | |
|---|---|---|---|
| 5,875,472 A | | 2/1999 | Bauman et al. |
| 6,026,475 A | * | 2/2000 | Woodman ............ G06F 11/3452 711/200 |
| 6,044,478 A | * | 3/2000 | Green ................. G06F 12/0815 711/141 |
| 6,129,458 A | * | 10/2000 | Waters .................. G06F 8/4442 711/133 |
| 6,223,256 B1 | | 4/2001 | Gaither et al. |
| 6,389,442 B1 | | 5/2002 | Yin et al. |

(Continued)

OTHER PUBLICATIONS

Notice of Allowance dated Jun. 27, 2016, for U.S. Appl. No. 14/479,239 of Waldspurger, C. et al., filed Sep. 5, 2014.

(Continued)

*Primary Examiner* — Robert B Leung
(74) *Attorney, Agent, or Firm* — FisherBroyles, LLP

(57) ABSTRACT

A processor cache is logically partitioned into a main partition, located in the cache itself, and an enclave partition, located within an enclave, that is, a hardware-enforced protected region of an address space of a memory. This extends the secure address space usable by and for an application such as a software cryptoprocessor that is to execute only in secure regions of cache or memory.

20 Claims, 2 Drawing Sheets

(56) References Cited

U.S. PATENT DOCUMENTS

| | | |
|---|---|---|
| 6,697,927 B2 | 2/2004 | Bonola et al. |
| 6,957,304 B2 | 10/2005 | Wilkerson et al. |
| 6,970,960 B1 | 11/2005 | Sarfati et al. |
| 7,266,661 B2 | 9/2007 | Walmsley et al. |
| 7,434,000 B1 | 10/2008 | Barreh et al. |
| 7,577,851 B2 | 8/2009 | Inamura et al. |
| 7,657,756 B2 | 2/2010 | Hall et al. |
| 7,671,864 B2 | 3/2010 | Román et al. |
| 7,774,622 B2 | 8/2010 | Mitra et al. |
| 8,037,250 B1 | 10/2011 | Barreh et al. |
| 8,135,962 B2 | 3/2012 | Strongin et al. |
| 8,266,676 B2 | 9/2012 | Hardjono et al. |
| 8,352,718 B1 | 1/2013 | Rao et al. |
| 8,549,288 B2 | 10/2013 | Bade et al. |
| 8,615,665 B2 | 12/2013 | Fitton et al. |
| 8,726,364 B2 | 5/2014 | Smith et al. |
| 8,738,932 B2 | 5/2014 | Lee et al. |
| 8,782,433 B2 | 7/2014 | Kaabouch et al. |
| 8,812,796 B2 | 8/2014 | Gray et al. |
| 8,886,959 B2 | 11/2014 | Tamiya et al. |
| 8,904,477 B2 | 12/2014 | Walker et al. |
| 8,924,743 B2 | 12/2014 | Wolfe et al. |
| 8,949,797 B2 | 2/2015 | Christodorescu et al. |
| 8,990,582 B2 | 3/2015 | McGrew et al. |
| 9,164,924 B2 | 10/2015 | Horowitz et al. |
| 9,361,449 B2 | 6/2016 | Sugano |
| 9,477,603 B2 | 10/2016 | Waldspurger et al. |
| 9,639,482 B2 | 5/2017 | Weis et al. |
| 9,734,092 B2 | 8/2017 | Weis et al. |
| 9,747,450 B2 | 8/2017 | Horowitz et al. |
| 2002/0004860 A1 | 1/2002 | Roman et al. |
| 2002/0116584 A1 | 8/2002 | Wilkerson et al. |
| 2002/0116595 A1 | 8/2002 | Morton et al. |
| 2002/0138700 A1 | 9/2002 | Holmberg et al. |
| 2003/0033480 A1 | 2/2003 | Jeremiassen et al. |
| 2003/0065892 A1 | 4/2003 | Bonola et al. |
| 2003/0135742 A1* | 7/2003 | Evans ............... G06F 21/84 713/189 |
| 2003/0188178 A1 | 10/2003 | Strongin et al. |
| 2003/0236947 A1 | 12/2003 | Yamazaki et al. |
| 2004/0111639 A1 | 6/2004 | Schwartz et al. |
| 2004/0139346 A1* | 7/2004 | Watt ................. G06F 21/74 713/166 |
| 2006/0015748 A1 | 1/2006 | Goto et al. |
| 2006/0020941 A1 | 1/2006 | Inamura et al. |
| 2006/0080553 A1 | 4/2006 | Hall et al. |
| 2006/0143396 A1* | 6/2006 | Cabot ............... G06F 12/121 711/134 |
| 2006/0179228 A1* | 8/2006 | Thompson ........ G06F 9/30032 711/129 |
| 2007/0239938 A1 | 10/2007 | Pong et al. |
| 2007/0288228 A1 | 12/2007 | Taillefer et al. |
| 2008/0010413 A1 | 1/2008 | Kailas et al. |
| 2008/0022160 A1 | 1/2008 | Chakraborty et al. |
| 2008/0109660 A1 | 5/2008 | Mitra et al. |
| 2008/0229118 A1 | 9/2008 | Kasako et al. |
| 2008/0235804 A1 | 9/2008 | Bade et al. |
| 2009/0094601 A1 | 4/2009 | Vstovskiy |
| 2009/0254895 A1 | 10/2009 | Chen et al. |
| 2009/0328195 A1 | 12/2009 | Smith et al. |
| 2010/0005300 A1 | 1/2010 | Klotsche et al. |
| 2010/0062844 A1 | 3/2010 | Crowder, Jr. et al. |
| 2010/0064144 A1 | 3/2010 | Kaabouch et al. |
| 2010/0115620 A1 | 5/2010 | Alme et al. |
| 2010/0268692 A1 | 10/2010 | Resch et al. |
| 2010/0281223 A1* | 11/2010 | Wolfe ............... G06F 12/0808 711/133 |
| 2010/0281273 A1 | 11/2010 | Lee et al. |
| 2010/0287385 A1 | 11/2010 | Conte et al. |
| 2011/0022818 A1 | 1/2011 | Kegel et al. |
| 2011/0040940 A1* | 2/2011 | Wells ................. G06F 12/084 711/128 |
| 2011/0047362 A1 | 2/2011 | Eichenberger et al. |
| 2011/0113260 A1 | 5/2011 | Ma et al. |
| 2011/0167278 A1 | 7/2011 | Goto et al. |
| 2011/0258610 A1 | 10/2011 | Aaraj et al. |
| 2011/0314468 A1 | 12/2011 | Zhou et al. |
| 2012/0124296 A1 | 5/2012 | Bryant et al. |
| 2012/0317569 A1 | 12/2012 | Payne, Jr. |
| 2013/0067245 A1 | 3/2013 | Horovitz et al. |
| 2013/0090091 A1 | 4/2013 | Weng et al. |
| 2013/0125244 A1 | 5/2013 | Sugano et al. |
| 2013/0159726 A1 | 6/2013 | McKeen et al. |
| 2013/0191601 A1* | 7/2013 | Peterson ............ G06F 12/0868 711/137 |
| 2013/0191651 A1* | 7/2013 | Muff .................. G06F 12/1027 713/193 |
| 2013/0254494 A1 | 9/2013 | Oxford et al. |
| 2013/0263121 A1 | 10/2013 | Franke et al. |
| 2014/0006711 A1* | 1/2014 | Xing ..................... G06F 12/10 711/118 |
| 2014/0007087 A1 | 1/2014 | Scott-Nash |
| 2014/0108649 A1 | 4/2014 | Barton et al. |
| 2014/0173275 A1* | 6/2014 | Johnson ................. H04L 9/00 713/161 |
| 2014/0201452 A1 | 7/2014 | Meredith et al. |
| 2015/0067265 A1 | 3/2015 | Weis et al. |
| 2015/0089152 A1 | 3/2015 | Busaba |
| 2015/0089153 A1 | 3/2015 | Busaba |
| 2015/0089154 A1 | 3/2015 | Busaba |
| 2015/0089155 A1 | 3/2015 | Busaba |
| 2015/0089159 A1 | 3/2015 | Busaba |
| 2015/0089502 A1 | 3/2015 | Weis et al. |
| 2015/0134932 A1 | 5/2015 | Mcnairy |
| 2015/0149732 A1 | 5/2015 | Kiperberg et al. |
| 2015/0186295 A1 | 7/2015 | Long et al. |
| 2015/0227744 A1 | 8/2015 | Horowitz et al. |
| 2015/0269091 A1 | 9/2015 | Horowitz et al. |
| 2015/0378731 A1 | 12/2015 | Lai |
| 2016/0224475 A1 | 8/2016 | Horovitz et al. |
| 2017/0206167 A1 | 7/2017 | Waldspurger et al. |

OTHER PUBLICATIONS

Non-Final Office Action dated Jul. 28, 2016, for U.S. Appl. No. 14/497,111 of Horovitz, O. et al., filed Sep. 25, 2014.

Non-Final Office Action dated Jul. 27, 2016, for U.S. Appl. No. 14/663,217 of Horovitz, O. et al., filed Mar. 19, 2015.

First Office Action dated Aug. 2, 2016, for Japanese Patent Application No. 2014-530797, 7 pages.

Deayton, Peter et al., "Set Utilization Based Dynamic Shared Cache Partitioning", Parallel and Distributed Systems (ICPADS), 2011 IEEE 17th International Conference, Dec. 7-9, 2011, pp. 284-291.

Li, Zhiyuan , "Reducing Cache Conflicts by Partitioning and Privatizing Shared Arrays", Parallel Architectures and Compilation Techniques Proceedings, International Conference on 1999, 1999, pp. 183-190.

Rajimwale, Abhishek et al., "Coerced Cache Eviction and Discreet Mode Journaling: Dealing with Misbehaving Disks", IEEE/IFIP 41st International Conference on Dependable Systems & Networks (DSN), Jun. 27-30, 2011, pp. 518-529.

"Intel 64 and IA-32 Architectures Software Developer's Manual, vol. 3 (3A, 3B & 3C): System Programming Guide," Intel Corporation, Dec. 2015, pp. 1-1698. [Part 1].

"Intel 64 and IA-32 Architectures Software Developer's Manual, vol. 3 (3A, 3B & 3C): System Programming Guide," Intel Corporation, Dec. 2015, pp. 1-1698. [Part 2].

"Intel 64 and IA-32 Architectures Software Developer's Manual, vol. 3 (3A, 3B & 3C): System Programming Guide," Intel Corporation, Dec. 2015, pp. 1-1698. [Part 3].

"Intel 64 and IA-32 Architectures Software Developer's Manual, vol. 3 (3A, 3B & 3C): System Programming Guide," Intel Corporation, Dec. 2015, pp. 1-1698. [Part 4].

"Intel 64 and IA-32 Architectures Software Developer's Manual, vol. 3 (3A, 3B & 3C): System Programming Guide," Intel Corporation, Dec. 2015, pp. 1-1698. [Part 5].

"Intel 64 and IA-32 Architectures Software Developer's Manual, vol. 3 (3A, 3B & 3C): System Programming Guide," Intel Corporation, Dec. 2015, pp. 1-1698. [Part 6].

(56) References Cited

OTHER PUBLICATIONS

"Intel 64 and IA-32 Architectures Software Developer's Manual, vol. 3 (3A, 3B & 3C): System Programming Guide," Intel Corporation, Dec. 2015, pp. 1-1698. [Part 7].
Trusted Computing Group, [retrieved on Nov. 12, 2015], Retrieved from the internet: <http://www.trustedcomputinggroup.org>, 2015, 1 page.
Cache management via page coloring, Wikipedia, [retrieved on Nov. 12, 2015], Retrieved from the Internet: <http://en.Wikipedia.org/wiki/cache_coloring>, Nov. 6, 2015, 2 pages.
Hardware security module, Wikipedia, [retrieved on Nov. 12, 2015], Retrieved from the Internet: <http://en.wikipedia.org/wiki/hardware_security_module>, Oct. 21, 2015, 5 pages.
Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.
Anati Ittai, et al., "Innovative Technology for CPU Based Attestation and Sealing", Proceedings of the Second International Workshop on Hardware and Architectural Support for Security and Privacy (HASP '13), Jun. 2013, pp. 1-7.
Baumann, A., et al., "Shielding Applications from an Untrusted Cloud wth Haven," Proceedings of the 11th USENIX Symposium on Operating Systems Design and Implementation, Oct. 6-8, 2014, pp. 267-283.
Bellard, F., "QEMU, a fast and portable dynamic translator", Proceedings of the USE NIX 2005 Annual Technical Conference, FREENIX Track, Apr. 2005, pp. 41-46.
Bochs, "The Cross-Platform IA-32 Emulator" [retrieved on Aug. 26, 2015] Retrieved from the Internet: <http://bochs.sourceforge.net/>, May 3, 2015, 2 pages.
Bugnion, E. et al., "Compiler-directed page coloring for multiprocessors", Proceedings of the Seventh International Conference on Architectural Support for Programming Languages and Operating Systems (ASPLOS VII), ACM, Oct. 1996, 12 pages.
Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.
Chen, X., et al., "Operating System Controlled Processor-Memory Bus Encryption", in Proceedings of Design, Automation and Test in Europe, 2008, (DATE'08), IEEE, pp. 1154-1159.
Iyer, Ravi, "COoS: A Framework for Enabling OoS in Shared Caches of CMP Platforms," In Proceedings of the 18th Annual International Conference on Supercomputing (ICS '04), ACM, Jun. 26-Jul. 1, 2004, pp. 257-266.
McKeen, F., et al., "Innovative Instructions and Software Model for Isolated Execution", Proceedings of the Second International Workshop on Hardware and Architectural Support for Security and Privacy (HASP '13), ACM, Jun. 2013, pp. 1-8.
Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.
Peterson, Peter A.H., "Cryptkeeper: Improving Security with Encrypted RAM", in IEEE International Conference on Technologies for Homeland Security (HST 2010), Nov. 2010, pp. 1-7.
Ports, Dan R.K. et al., "Towards application security on untrusted operating systems", Proceedings of the Third Conference on Hot Topics in Security (HOTSEC '08), Jul. 2008, 7 pages.
Rosenblum, M., et al., "Using the SimOS machine simulator to study complex computer systems", ACM Transactions on Modeling and Computer Simulation, vol. 7, Issue 1, Jan. 1997, pp. 78-103.
Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.
Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102.
Advisory Action dated Aug. 19, 2014, for U.S. Appl. No. 13/614,935 of Horovitz, O. et al., filed Sep. 13, 2015.
Extended European Search Report dated Aug. 5, 2015, for European Patent Application No. 12831564.5, 7 pages.
Final Office Action dated Jun. 5, 2014, for U.S. Appl. No. 13/614,935 of Horovitz, O., filed Sep. 13, 2012.
International Search Report and Written Opinion of International Application No. PCT/US12/55210, dated Jan. 25, 2013, 11 pages.
Non-Final Office Action dated Feb. 19, 2015, for U.S. Appl. No. 13/614,935 of Horovitz, O., filed Sep. 13, 2012.
Non-Final Office Action dated Nov. 18, 2013, for U.S. Appl. No. 13/614,935 of Horovitz, O., filed Sep. 13, 2012.
Notice of Allowance dated Jul. 15, 2015, for U.S. Appl. No. 13/614,935 of Horovitz, O., filed Sep. 13, 2012.
Restriction Requirement dated Aug. 27, 2013, for U.S. Appl. No. 13/614,935 of Horovitz, O. et al., filed Sep. 13, 2015.
U.S. Appl. No. 13/614,935, of Horovitz, O., et al. filed Sep. 13, 2012.
U.S. Appl. No. 14/479,239 of Horovitz, O. et al., filed Aug. 5, 2014.
U.S. Appl. No. 14/497,111 of Horovitz, O. et al., filed Sep. 25, 2014.
U.S. Appl. No. 14/618,099 of Horovitz, O. et al., filed Feb. 10, 2015.
U.S. Appl. No. 14/663,217 of Horovitz, O. et al., filed Mar. 19, 2015.
U.S. Appl. No. 14/820,428 of Horovitz, O. et al., filed Aug. 6, 2015.
Non-Final Office Action dated Nov. 15, 2016, for U.S. Appl. No. 14/618,099 of Horovitz, O. et al., filed Feb. 10, 2015.
Non-Final Office Action dated Oct. 6, 2016, U.S. Appl. No. 14/820,428 of Horovitz, O. filed Aug. 6, 2015.
U.S. Appl. No. 15/274,981 of Waldspurger, C., et al., filed Sep. 23, 2016.
Final Office Action dated Dec. 27, 2016, for U.S. Appl. No. 14/497,111 of Horovitz, O. et al., filed Sep. 25, 2014.
Final Office Action dated Jan. 13, 2017, for U.S. Appl. No. 14/663,217 of Horovitz, O. et al., filed Mar. 19, 2015.
Second Office Action dated Dec. 6, 2016 for Japanese Patent Application No. 2014-530797, 4 pages.
Notice of Allowance dated Jan. 25, 2017 for U.S. Appl. No. 14/820,428 of Horovitz, O. et al., filed Aug. 6, 2015.
Notice of Allowance dated Jun. 15, 2017 of U.S. Appl. No. 14/663,217 by Horovitz, O., et al., filed Mar. 19, 2015.
Non-Final Office Action dated May 26, 2017, for U.S. Appl. No. 14/497,111 of Horovitz, O. et al., filed Sep. 25, 2014.
Notice of Allowance dated May 4, 2017, for U.S. Appl. No. 14/618,099 of Horovitz, O. et al., filed Feb. 10, 2015.
Final Office Action dated Nov. 15, 2017, for U.S. Appl. No. 14/497,111 of Horovitz, O. et al., filed Sep. 25, 2014.

* cited by examiner

METHOD AND SYSTEM FOR USING PROCESSOR ENCLAVES AND CACHE PARTITIONING TO ASSIST A SOFTWARE CRYPTOPROCESSOR

CROSS-REFERENCE TO RELATED APPLICATIONS

This application claims priority of U.S. Provisional Patent Application No. 61/885,477, filed 1 Oct. 2013.

FIELD OF THE INVENTION

This invention relates to a method and related system implementation for increasing the secure space available to a cache-based process such as a software cryptoprocessor.

BACKGROUND

Many computer systems routinely process sensitive and valuable information. It is important to protect the confidentiality and integrity of computer data from many different security threats. Defending systems from unauthorized physical access and malicious hardware devices is particularly challenging, especially in cloud-computing environments, where users do not have physical control over the hardware which executes their workloads.

U.S. Published Patent Application 2013/0067245, which is hereby incorporated by reference, discloses a software-based cryptoprocessor system that employs cryptographic techniques to provide confidentiality and integrity for an entire system, including both user-mode applications and privileged system software. With this cryptoprocessor, only the main processor is trusted to operate according to its specifications, and other system hardware is considered untrusted and potentially malicious. Data (including code) is available as cleartext only within the processor cache, but remains encrypted in main memory. Techniques such as authenticated, encrypted demand paging can be used to transfer data securely between main memory and the processor cache. As one example, an encryption agent is installed to be resident in the cache, functionally between the main processor and memory, so as to encrypt data/code that is written to memory and to decrypt it before it is passed from memory to the processor. In effect, the cryptoprocessor system treats the processor cache like main memory in a conventional system, and it treats main memory like a conventional backing store on disk or other secondary storage.

It is challenging for a software-based cryptoprocessor system to achieve high performance while providing secure execution. For example, performance can be degraded as a result of increased memory pressure, due to the relatively small amount of cache space serving as "main memory". For example, while a modern Intel x86 processor contains tens of megabytes of cache memory, typical systems using such processors are configured with tens of gigabytes of RAM used as main memory-roughly a thousand times larger than the cache. If the amount of memory needed by a workload over some time period, known as its "working set", exceeds the cache size, this can result in significant overhead, due to encrypted paging of data between the small trusted memory (cache) and the large untrusted backing store (RAM). A substantial fraction of this overhead may be incurred by the cryptographic operations that must be performed during each transfer of data. In other words, the general goal of a cache is to increase execution speed, but the space in the cache-regardless of how many levels it includes-will almost always be much smaller that the address space of the memory that ne may wish to be able to cache; however, the time it takes to swap lines between the cache and memory may therefore partially or totally negate the speed advantage the cache is intended to provide.

DETAILED DESCRIPTION

Broadly, embodiments of the invention are described below that employ cache-partitioning techniques, together with secure processor enclaves, to provide a large, secure backing store, which is especially useful in a software-based cryptoprocessor system. Cache partitioning may thereby prevent cache lines containing enclave data from evicting other non-enclave cache lines. The embodiments are described and illustrated in the context of a software cryptoprocessor, but may be employed to improve the performance of any process that is to execute securely from within a CPU cache but needs or would benefit from more space than the cache is architected to provide. Before getting into the details of embodiments of the invention, it is therefore helpful to keep in mind certain features of a software cryptoprocessor, as well as "enclaves".

Software Crytoprocessor

Figure 1:
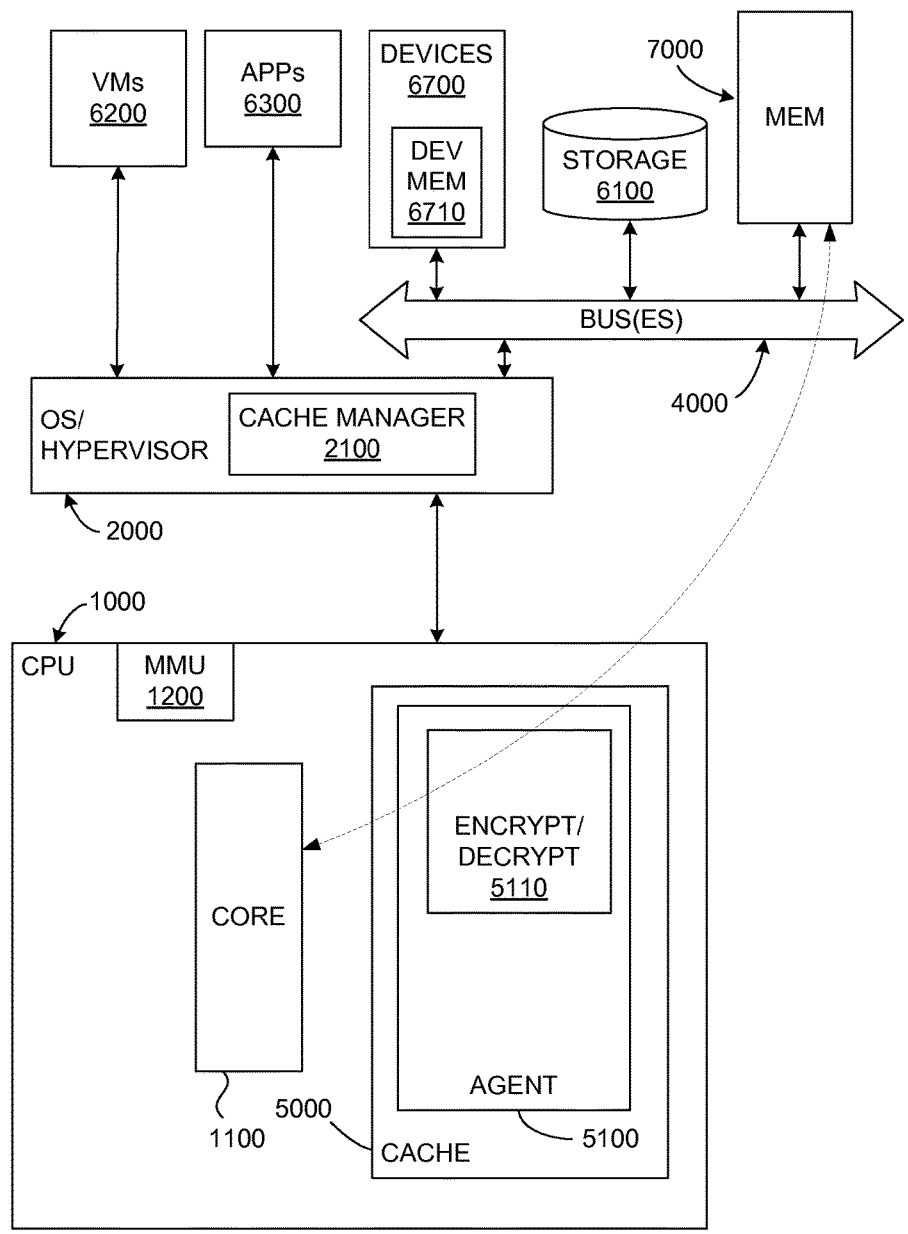
FIG. 1 is a simplified illustration of a computer system that incorporates a software cryptoprocessor of the type disclosed in U.S. Published Patent Application 2013/0067245.

FIG. 1 is a greatly simplified illustration of a computer system that incorporates a software cryptoprocessor of the type disclosed in U.S. Published Patent Application 2013/0067245. As with other computer systems, a main processor CPU 1000 with one or more cores 1100 is included to receive and process instructions using well-known components and circuitry, in conjunction with an operating system (OS) and/or hypervisor 2000, which schedule and coordinate the execution of processes such as virtual machines 6200 and other applications 6300. Some form of storage 6100 such as a hard disk system will normally be included along with typically less persistent but faster memory devices such as system memory 7000. Various devices 6700, which can encompass almost any known devices such as additional storage, network, human interface, chipset, etc., may also be included.

In FIG. 1, the system memory 7000 is shown as a single component MEM, but this is merely for the sake of clarity; in most implementations, the system memory 7000 will comprise different high-speed memory devices that may be included either stand-alone, such as for the main system memory, dedicated and located within different devices, etc. From the perspective of the CPU, the system memory 7000 is an addressable memory space, which does not need to be within one component or contiguous. One or more memory management units 1200 will typically also be included to perform well-known functions.

In the context not only of the software cryptoprocessor in general, but also of this invention, a particularly relevant component is a cache 5000, which is generally part of the CPU 1000 itself, although there are also some proposals to architect off-CPU processor caches as well. The general structure and properties of a cache are well-understood in the field of computer science and will therefore not be described further here except as needed to further understanding of the different embodiments of the invention.

An agent 5100, which is a software component within the system software 2000, which resides in the cache 5000 at run time, and which defines the essential aspect of the cache-based, software cryptoprocessor, includes an encryption/decryption module 5110. Depending on the implementation, the system software 2000 may include a cache management module 2100 that also performs various cache-related tasks; in these cases, it is possible for the agent 5100 to be either identical to or a sub-component of such a cache management module 2100. The agent 5100 may be included either as a dedicated component in the system software, or be incorporated into any other appropriate system software component. In another embodiment, the agent 5100 may be an independent component resident in the cache, in which case the cache management module 2100 may not be necessary and the OS/hypervisor may be an unmodified system software layer.

As is illustrated by the dashed line, instructions and data passing between the cache and at least some portions of the memory system can be made visible to and be intercepted by the agent 5100. Whenever this information (data and/or instructions) is transmitted from the CPU, in particular from the core 1100 or some other internal CPU component, this transmission is intercepted by the agent 5100 and is encrypted by the agent module 5110 before it is returned outside of the logical boundaries of the CPU 1000, in particular, to system memory 7000. Instructions and data inbound to the CPU core or internal components are then decrypted by the agent 5110 before they are submitted for processing. Additions to the basic cryptoprocessor implementation allow for whole or selective encryption/decryption of information passing between the CPU and other sub-systems, such as one or more device memories 6710 and the storage device(s) 6100.

Different processor architectures will have different cache structures and some have more than one. Caches often have different levels. In x86 systems, for example, there are levels L1-L3, with L3 (last-level cache) being the largest. The L3 cache at least partially includes the lower level L1 and L2 caches such that when a lower level cache experiences a miss, it will read through the next level cache, not directly from memory.

Enclaves

Recent extensions to computer processors, such as the Intel Software Guard Extensions (SGX) for the x86 processor architecture, provide hardware support for secure application execution. Such extensions allow a user-mode application to create a protected region, known as an "enclave", within the application's address space. The hardware provides confidentiality and integrity for an enclave, even from privileged malware and physical attacks on memory, through cryptography and hardware isolation of memory. In other words, SGX comprises a set of instructions and memory access changes to the Intel architecture that allow a process to create a protected region of its address space, known as an "enclave", which provides hardware-enforced confidentiality and integrity protection for data and code against potentially-malicious privileged code or hardware attacks such as memory probes.

The concept of an "enclave" involves both the memory and the hardware processor itself. In practice, to implement one or more enclaves, the CPU 110 is configured by the manufacturer to enable selection of one or more portions of memory and to transparently encrypt and verify its/their contents as it/they get/s pulled into the CPU cache for execution and access. Thus, the active component of an enclave will reside within the CPU, although its contents may, when not active, reside within the selected portion of memory. Any reference here to an enclave being "in" any given memory is therefore merely for the sake of simplicity and this operation of an enclave may be assumed.

Figure 2:
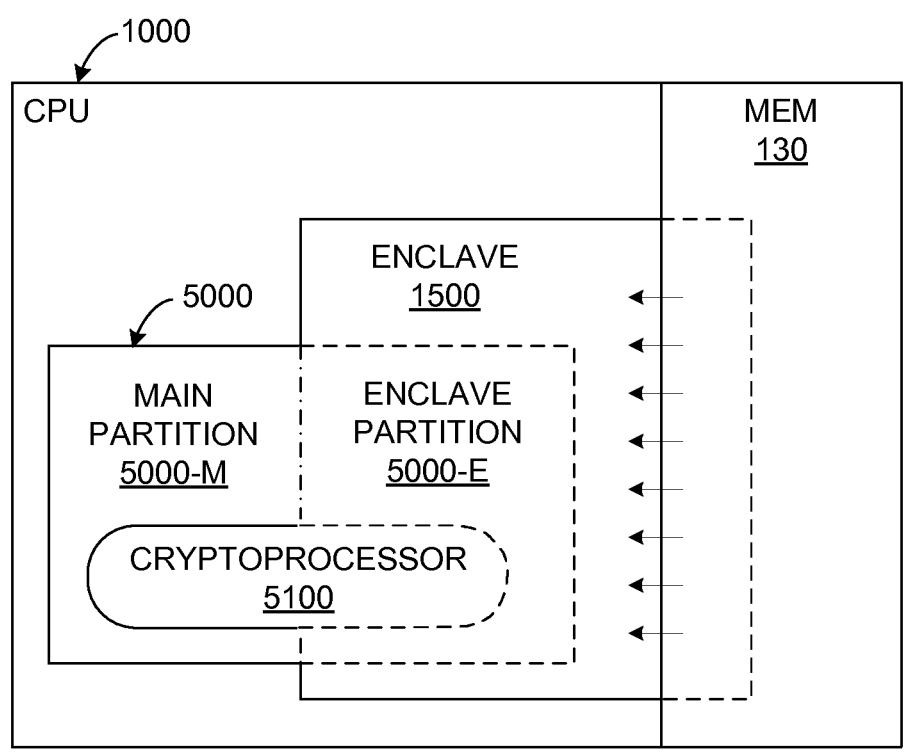
FIG. 2 illustrates use of one or more secure enclaves to augment the usable space of a secure cache-based process.

FIG. 2 illustrates this in that an enclave 1500 is show as being within the CPU 1000, but with contents at least partially pulled in (represented by the multiple arrows) from one or more portions of the memory 130. FIG. 2 illustrates the general idea of the invention: The processor cache—preferably the last-level cache (LLC) is partitioned into a main partition 5000-M and an enclave partition 5000-E. The software cryptoprocessor keeps all data in the main partition resident in the cache by using information about address-to-cache-set mappings to prevent cache evictions. The enclave partition may contain partial data from portions of a much larger memory region. As cache fills and evictions move data between the enclave partition and main memory, hardware encryption and integrity checks ensure its confidentiality and integrity.

Some hardware implementations of processor security extensions limit protection to user-mode applications, and do not allow protected enclave memory to be shared across multiple address spaces. As a result, such hardware does not support the secure execution of privileged system software, such as an operating system, hypervisor, or kernel-mode software cryptoprocessor components. Moreover, practical hardware implementations may impose other limits, such as a maximum size for a single enclave, or a limit on the total amount of protected physical memory aggregated across all enclaves.

Uncontrolled cache conflicts represent an even more significant problem, since they can result in violations of confidentiality and integrity. The caching of enclave memory is typically managed by hardware that transfers data between the cache and main memory securely, such as by encrypting cache line data on evictions, and decrypting cache line data on fills. Since the hardware may protect enclave cache lines cryptographically, a software cryptoprocessor would not need to do anything to protect cached enclave memory. In contrast, the hardware does not provide any such cryptographic protection for cached non-enclave memory, so the software cryptoprocessor must ensure that non-enclave memory is never evicted from the cache, except under its explicit control. Unfortunately, the ordinary caching of enclave memory may cause evictions of non-enclave memory, including cache-resident cleartext data managed by the software cryptoprocessor system. As a result, new methods are required to enable the secure use of processor enclaves within a software cryptoprocessor.

Embodiments of this invention utilize processor security extensions such as enclaves to both harden and accelerate a software cryptoprocessor system. This makes it possible to protect the entire software stack, including both applications and system software, assisted by efficient hardware support that offers strong guarantees regarding memory confidentiality and integrity.

As FIG. 2 illustrates, embodiments of the invention employ cache partitioning techniques, together with one or more secure processor enclaves, to provide a large, secure backing store, especially in a software-based cryptoprocessor system. Cache partitioning is here used to prevent cache lines containing enclave data from evicting other non-enclave cache lines. In one implementation, two cache partitions are created through the use of techniques that prevent cache evictions—the "enclave partition" 5000-E, containing data secured by hardware within an enclave, and the "main partition" 5000-M, containing data secured by the software cryptoprocessor.

In other words, the architected security features of the enclave 1500 ensure the security of information stored within the cache's 5000 enclave partition 5000-E, but the software cryptoprocessor, as illustrated in FIG. 1 and described above, will encrypt/decrypt data (defined broadly, to include both code and non-executable information) stored within the cache's main partition 5000-M. In FIG. 2, the main and enclave partitions are illustrated as being contiguous. This is merely for the sake of clarity—in practice, these partitions may comprise any non-conflicting sub-sets of the cache 5000, which may be either contiguous or discontiguous.

Partitioning may be implemented using known software techniques, such as page coloring (see, for example, Edouard Bugnion, Jennifer M. Anderson, Todd C. Mowry, Mendel Rosenblum, and Monica S. Lam, 1996, "Compiler-directed page coloring for multiprocessors", *Proceedings of the Seventh International Conference on Architectural Support for Programming Languages and Operating Systems* (ASPLOS VII), ACM, New York, N.Y., USA, pp. 244-255 ("Bugnion"); and Xiao Zhang, Sandhya Dwarkadas, and Kai Shen, 2009, "Towards practical page coloring-based multi-core cache management",*Proceedings of the 4th ACM European Conference on Computer Systems* (EuroSys '09), ACM, New York, N.Y., USA, pp. 89-102 ("Zhang")) or other software-based methods capable of partitioning memory units into non-conflicting sets. Alternatively, cache partitioning may be implemented using hardware techniques, such as proposed processor support for "way partitioning" or other cache quality-of-service (CQoS) features as described in, for example, Ravi Iyer. 2004. CQoS: A framework for enabling QoS in shared caches of CMP platforms. In *Proceedings of the 18th Annual International Conference on Supercomputing* (ICS '04). ACM, New York, N.Y., USA, 257-266 ("Iyer"). On such processors, system software controls the allocation and partitioning of cache space between the main partition and the enclave partition.

FIG. 2 illustrates shows the cryptoprocessor (that is, its agent component) 5100 resident in both the cache proper, that is, its main partition 5000-M and by extension into the enclave partition 5000-E as well. The FIG. 2 illustration is, as mentioned above, at least partially conceptual—the portion of the cryptoprocessor shown within the enclave partition 5000-E represents the fills and evictions moved from and to the enclave, to and from the main partition 5000-M or main memory. The cryptoprocessor may be configured to carry out the partitioning, and then as needed extend its storage into the enclave partition, which forms a backing store for the cache. One alternative, to ensure security even during the set-up stage, is to load a portion of the cache-resident agent 5100 into an enclave first and then, with such a trusted base established, bootstrap anything running in the cache outside the enclave.

A large backing store may be provided by aggregating virtual address space regions associated with one or more enclaves. Different enclaves may reside in separate processes with distinct virtual address spaces. System software is thereby modified to manage and demand-page enclave memory securely, for example, using the Intel SGX EWB and ELD extensions to the x86 instruction set (see McKeen).

In one implementation, the system may expose the secure backing store using a standard block device interface, addressed by a block number. The system translates the block number to its corresponding enclave and an offset within the enclave address space. A portion of non-enclave cache-resident physical memory is mapped into the enclave address space, providing a shared area that can be used for copying data into and out of the enclave during block I/O operations. To perform a block read, its associated data must be resident in protected enclave memory, possibly requiring a secure page-in operation, which may be carried out, for example, using the Intel SGX ELD instruction. The block data may then be copied from the enclave 1500 into non-enclave, cache-resident memory in the main partition 5000-M. To perform a block write, its associated data must be copied from the main partition 5000-M into the enclave address space 5000-E. If the corresponding page is not already resident in the protected enclave memory, it must first be paged in securely, for example, using the Intel SGX ELD instruction. Due to contention for limited resident enclave space, allocating space for this page-in may induce reclamation of other resident enclave pages via secure page-out operations, for example, using the Intel SGX EWB instruction.

A software cryptoprocessor system may thus create secure processor enclaves to implement a large, secure backing store. The system preferably attests each enclave that it creates before trusting it to provide secure backing store, for example, by performing the typical Intel SGX enclave attestation process. See, for example, McKeen as well as Ittai Anati, et al., "Innovative Technology for CPU Based Attestation and Sealing", *Proceedings of the Second International Workshop on Hardware and Architectural Support for Security and Privacy* (HASP '13), Tel-Aviv, Israel, June 2013 ("Anati"). Cache partitioning as disclosed herein thus isolates cache-resident enclave memory from cache-resident non-enclave memory, so that contention for cache lines due to enclave memory accesses cannot cause non-enclave cache lines to be evicted.

The system provides the abstraction of a large, secure backing store by aggregating the virtual address space regions associated with one or more enclaves. (Only one enclave is shown in the figures only for the sake of simplicity.) In some implementations, the hardware may limit the maximum size of a single enclave. When necessary, multiple enclaves may then be instantiated to avoid this limitation. For example, with a 256 MB maximum enclave size, it is not possible to create a single large 1 GB enclave, but four smaller 256 MB enclaves (or other configurations, such as sixteen 64 MB enclaves) can be created instead.

In some embodiments, all of the memory associated with an enclave may be populated and verified prior to launching it. For example, Intel SGX may require issuing an EADD instruction for each page that will be used in the enclave address space, prior to launching the enclave with the EINIT instruction. Once an enclave has been initialized, most of its associated memory, including meta-data, may then be securely paged out to unprotected RAM, such as by using the Intel SGX EWB instruction. A small number of pages must usually remain resident for each enclave, however, including an anchor page serving as the root for enclave address translations and version meta-data, as well as additional per-thread (TCS) and per-enclave (SECS) meta-data pages. This fixed overhead ultimately limits the maximum number of enclaves that can be supported by a given amount of protected physical RAM.

In one embodiment, the processor supports hardware cache partitioning via way partitioning. System software may therefore specify a "way mask" for the current-executing context, for example, by writing a special hardware register or memory location on each context switch. The way mask indicates the subset of set-associative cache "ways" that may be allocated by the currently-executing context. By using disjoint way masks, different portions of each cache set can be allocated to different contexts.

As one example, the software-based cryptoprocessor system can use two disjoint way masks—one for the "enclave partition" 5000-E, and another for the "main partition" 5000-M. For example, for a 20-way set-associative cache, the main partition may use ways 0-15, and the enclave may use ways 16-19. The way mask may then be set to specify the enclave partition 5000-E on enclave entry, and set to specify the main partition 5000-M on enclave exit. This ensures that any cache conflicts caused by accessing lines of enclave memory will evict only other lines also associated with enclave memory, without displacing any cache lines from the main partition.

In another implementation, such as one in which the processor does not provide hardware support, cache partitioning may be performed entirely in software. Software cache partitioning may thereby use techniques such as page coloring or any other known software-based methods capable of partitioning memory units into non-conflicting sets.

Unfortunately, purely software-based partitioning approaches limit the fraction of main memory that can back the enclave partition. For example, in a system with 32 page colors, where the enclave partition consumes N colors, enclave virtual pages may be mapped to only a fraction f=N/32 of physical memory pages. In a practical software cryptoprocessor implementation, N is likely to be a small number, such as 1, in order to devote as much scarce cache space as possible to the main partition, which holds cleartext data for active computations. For a system configured with 64 GB RAM, this would constrain the aggregate amount of secure backing store to only 2 GB.

In some embodiments, all enclave pages and associated data structures, such as enclave meta-data, is stored in a contiguous region of protected physical memory. For example, in an x86 system that supports Intel SGX, the BIOS reserves a contiguous range of physical memory, known as Processor Reserved Memory (PRM), which contains the Enclave Page Cache (EPC) and other SGX data structures (see McKeen). The size of the PRM constrains the total amount of protected memory that can be cached in the enclave partition. In addition, the cache indexing function used by the processor may further constrain the usable cache partition size. Such constraints may reduce the effectiveness of software-based partitioning methods. However, note that at different points in time, a single page of physical memory in the EPC may store the contents of different enclave virtual pages, as pages are securely swapped in and out of enclave memory, for example, using the Intel SGX ELD and EWB instructions.

In some hardware implementations of secure processor extensions, the latency of entering or exiting an enclave may be significant. The organization and operation of the software cryptoprocessor may thereby reflect such costs and associated tradeoffs. For example, consider an x86 processor supporting Intel SGX, with particularly high EENTER and EEXIT costs. In such cases, it may be advantageous to dedicate one or more cores (or hyperthreads) to run code within the enclaves implementing the secure backing store, actively polling for incoming block read and write operations, in order to avoid expensive enclave entry and exit costs.

As with other software, the agent 5100 and, thus, the software cryptoprocessor, comprises a body of processor-executable code that will normally be embodied in a non-volatile, non-transitory storage medium before being loaded into the memory and then the cache for execution to perform the various functions described. In the various embodiments, the agent 5100, modified to carry out the partitioning techniques and coordination of the use of the partitions as disclosed, is a software module implemented with a computer program product comprising a computer-readable medium containing computer program code, which can be executed by the CPU 1000 for performing any or all of the steps, operations, or processes described.

What is claimed is:

1. A method for ensuring security of an application, comprising:
    loading a main portion of the application into a processor cache of a processor; and
    under control of the application, logically partitioning the processor cache to create an enclave partition within an enclave and a main partition not within the enclave such that loading of a cache line into the enclave partition will not result in an eviction from the main partition due to the enclave partition serving as a backing store for the main partition, wherein the enclave partition serving as the backing store for the main partition comprises performing at least one read operation, for data, in a sequence comprising:
        securely loading the data into the enclave partition; and
        in response, copying a version of the data from the enclave partition into the main partition not within the enclave;
    wherein the enclave:
        comprises hardware-enforced protected region of an address space of a memory, and
        forms an extension of the address space.

2. The method as in claim 1, further comprising:
    encrypting, using an encryption agent that is installed to be resident in the cache and that is functionally between the processor and memory, data or code that is stored in the main partition before being written to memory; and
    decrypting, using the encryption agent, data or code that is stored in the main partition after being read from memory.

3. The method as in claim 1, further comprising aggregating virtual address space regions associated with at least one of a plurality of enclaves.

4. The method as in claim 3, further comprising:
    exposing the enclave partition as the secure backing store, addressed by a block number;
    translating the block number to a corresponding enclave and location within the enclave's address space;
    mapping a portion of non-enclave, cache-resident physical memory into the enclave address space; and
    during input or output block operations, copying data block-wise into or out of the enclave.

5. The method as in claim 1, further comprising partitioning the cache by specifying a way mask for a current-executing context, the way mask indicating a subset of set-associative cache ways allocatable by the currently-executing context.

6. The method as in claim 5, further comprising specifying a plurality of disjoint way masks, each of the plurality of disjoint way masks corresponding to a different context, whereby different portions of the cache are allocated to different contexts.

7. The method as in claim 1, wherein the logical partitioning of the processor cache comprises:
   setting a first way mask configured to specify the enclave partition to be used for enclave entry; and
   setting a second way mask configured to specify the main partition to be used for enclave exit;
   whereby the first and second way masks cause, when cache conflicts occur caused by accessing lines of enclave memory, eviction of only other lines also associated with the enclave memory, without displacing any cache lines from the main partition.

8. A non-transitory computer-readable storage medium storing instructions that, when executed by one or more processors, causing the one or more processors to:
   load a portion of a software cryptoprocessor into a processor cache; and
   under control of the software cryptoprocessor, logically partition the processor cache to create an enclave partition within an enclave and a main partition not within the enclave,
      such that loading of a cache line into the enclave partition will not result in an eviction from the main partition due to performing at least one read operation, for data, in a sequence comprising:
         using a first way mask to securely load the data into the enclave partition; and
         in response, using a second way mask to copy a version of the data from the enclave partition into the main partition not within the enclave;
   wherein the enclave comprises a hardware-enforced protected region of an address space of a memory and forms an extension of the address space.

9. The computer-readable storage medium as in claim 8, further storing instructions defining an encryption agent to be resident in the cache, functionally between the processor and memory, wherein the encryption agent is configured to encrypt data or code that is written to memory and to decrypt data or code before it is passed from memory to the one or more processors.

10. The computer-readable storage medium as in claim 8, further storing instructions that, upon execution by the one or more processors, cause the one or more processors to aggregate virtual address space regions associated with at least one of a plurality of enclaves.

11. The computer-readable storage medium as in claim 10, further storing instructions that, upon execution by the one or more processors, causing the one or more processors to:
   expose the enclave partition as a secure backing store, addressed by a block number; and
   use the enclave partition as the secure backing store by:
      translating the block number to a corresponding enclave and location within the enclave's address space;
      mapping a portion of non-enclave, cache-resident physical memory into the enclave address space; and
      during input or output block operations, copying data block-wise into or out of the enclave.

12. The computer-readable storage medium as in claim 8, wherein the logical partitioning of the cache includes specifying at least the first way mask or the second way mask for a current-executing context, and wherein the first way mask or second way mask indicates a subset of set-associative cache ways allocatable by the currently-executing context.

13. The computer-readable storage medium as in claim 8, further storing instructions that, upon execution by the one or more processors, cause the one or more processors to specify a plurality of disjoint way masks, including at least the first way mask or the second way mask, each of the plurality of disjoint way masks corresponding to a different context, whereby different portions of the cache are allocated to different contexts.

14. The computer-readable storage medium as in claim 8, wherein the first way mask or second way mask specifies a particular hardware register or memory location used for writing, upon a context switch.

15. A computer program product having a non-transitory computer-readable storage medium storing computer-executable code configured to:
   load a main portion of a software application into a processor cache of a processor, wherein, upon the loading, the processor is under control of the software application; and
   logically partition the processor cache to create an enclave partition within an enclave and a main partition not within the enclave, wherein the enclave partition serves as a backing store for the main partition such that loading of a cache line into the enclave partition will not result in an eviction from the main partition, and wherein the enclave comprises a hardware-enforced protected region of an address space of a memory and forms an extension of the address space usable for the software application.

16. The computer program product as in claim 15, wherein an encryption agent is:
   installed to be resident in the cache,
   functionally between the processor and memory,
   configured to encrypt data or code that is written to memory, and
   configured to decrypt data or code before it is passed from memory to the processor.

17. The computer program product as in claim 15, further configured to aggregate virtual address space regions associated with at least one of a plurality of enclaves.

18. The computer program product as in claim 17, further configured to:
   expose the secure backing store, addressed by a block number;
   translate the block number to a corresponding enclave and location within the enclave's address space;
   map a portion of non-enclave, cache-resident physical memory into the enclave address space; and
   during input or output block operations, copy data into or out of the secure backing store.

19. The computer program product as in claim 15, wherein the logical partition of the processor cache is performed, by specifying a way mask for a current-executing context, the way mask indicating a subset of set-associative cache ways allocatable by the currently-executing context.

20. The computer program product as in claim 15, wherein the logical partitioning of the processor cache comprises:
   setting a way mask configured to specify the enclave partition to be used for enclave entry and configured to specify the main partition to be used for enclave exit.

* * * * *